E. H. Keith,
Molding Wood Screws.

2 Sheets—Sheet 1.

N° 78,212.  Patented May 26, 1868.

Witnesses:
J. H. Adams.
N. S. G. Wilde.

Inventor:
E. H. Keith

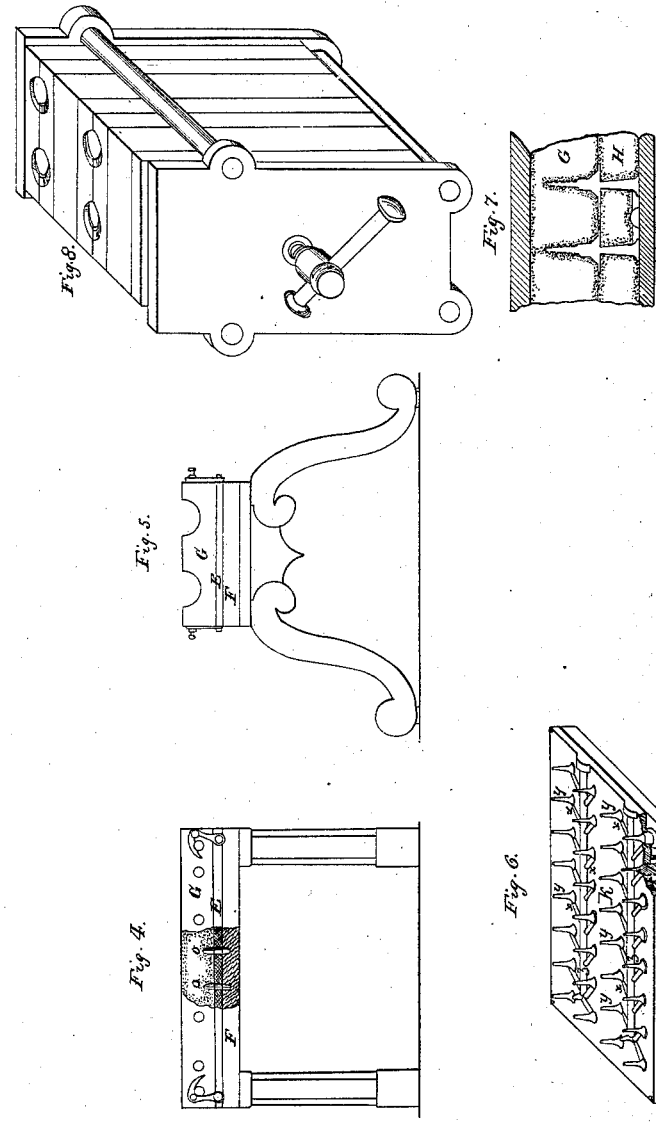

UNITED STATES PATENT OFFICE.

E. H. KEITH, OF BRIDGEWATER, MASSACHUSETTS.

IMPROVEMENT IN MACHINES FOR MOLDING WOOD-SCREWS.

Specification forming part of Letters Patent No. 78,212, dated May 26, 1868.

*To all whom it may concern:*

Be it known that I, EDWIN H. KEITH, of Bridgewater, in the county of Plymouth and State of Massachusetts, have invented a new and useful Improvement in Molding Wood-Screws, of which the following is a full, clear, and exact description, reference being had to the accompanying drawings, making a part of this specification, in which—

Figure 2:
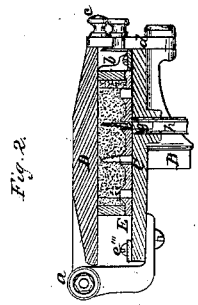
Figure 3:
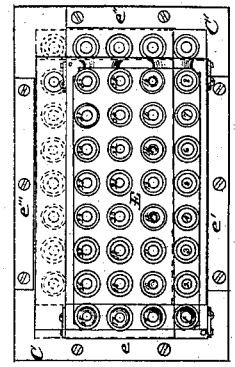
Figure 1:
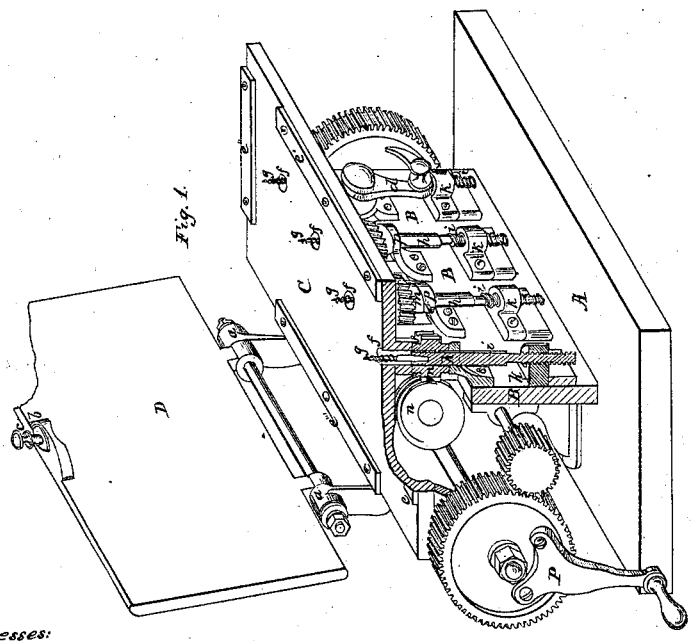

Figure 1 represents a perspective view of a machine for forming the molds, with a portion of the same broken away. Fig. 2 is a transverse vertical section of the table and its cover, with the molding-board and frame in position. Fig. 3 is a plan view of the molding-board when placed on the table, showing in colored and dotted lines the different positions in which it is to be placed. Fig. 4 is an elevation of a table, with the molding-board and frame for forming the heads of the screws, and with a portion broken away. Fig. 5 is an end view of the same. Fig. 6 is a plate for molding the leaders, runners, and sprues. Fig. 7 represents the finished mold, and Fig. 8 represents a frame containing the flasks ready for the reception of the melted metal.

Similar letters indicate like parts in the several figures.

The object of my invention is to produce a machine for forming the molds for casting screws from screw-patterns, so that a large number of molds can be formed from a very few patterns, and so that the patterns can be very easily removed and others substituted for the purpose of forming screw-molds of different sizes, all in one and the same machine, and by which means screws of cast material may be formed which shall be economical in manufacture, of great strength, and perfect uniformity of finish; and the invention consists of a machine in which a series of screw-patterns are combined with detachable spindles so arranged that they can be readily removed, and that screw-patterns of various sizes can be used and changed as to each series by a comparatively slight manipulation.

The invention also consists of a mold-board or heading-plate formed of a plate of metal provided with a large number of holes of the diameter required for the screw-shank, and also with projections for forming the molds for the screw-heads, so that by placing the said molding-plate upon a table forming part of the machine, and changing its position in relation to a limited number of screw-patterns passing through the holes in the said table, a mold will be formed in the composition for each hole in the mold-board.

The invention also consists in a peculiar arrangement of runners, leaders, and sprues, for admitting the melted metal into the molds, the metal being received on one side of the flask or cheek and passing through the same into the mold for the screw on the opposite side and into the center of the mold formed by the heading-plate. The mold-board or heading-plate is a part of the machine proper, and is the only molding-board required.

The invention also consists in a method of casting the screws so that the breakage from metal will be in the center of the head of the screws.

Referring to the drawings, A, Fig. 1, represents a base, on which is placed an upright plate or frame, B, supporting upon its top the table C, which latter is provided with a cover, D. The said cover is hinged to uprights or projections $a\ a$ at one side of the table, and is provided at its opposite side with a projecting lip, $b$, and a stud, $c$, so constructed and arranged as to keep the inner face of the cover D exactly parallel with the table C, and at a certain distance therefrom to correspond to the thickness of the molding-board and flask. A hook, $d$, at the front edge of the table C slips over the stud $c$ when the cover is closed and locks it securely. On the top of the table C, at each of the four sides, are attached metal strips $e\ e'\ e''\ e'''$, for the purpose of adjusting and setting the mold-board and flask in different positions, as hereinafter explained.

The table C is provided with four holes, $f f f f$, through which the pattern-screws pass into the molding-board and the composition of the mold. The screws $g\ g\ g\ g$, which form the patterns, are attached to or form a part of the spindles $h$, which latter pass through the worm-gears $m$, and are supported by collars $p$ and screw-nuts $k$, attached to front of the plate or frame B. The collars $p$ and screw-nuts $k$ are attached to the plate B by means of screws, so that they can be readily detached from the said plate or frame for the purpose of substituting spindles with screw-patterns of different or various sizes, the mold-board and flask corresponding to the size and length of the screw to be cast, without disturbing the machine itself. The lower portion of the spindle $h$ is formed with a screw-thread corresponding in pitch with the pattern screws $g\,g$, and constitutes the guide for the same, being of a sufficient length to raise the screw to the requisite height. Motion is communicated to the spindles in such a manner as to cause them to rotate, and at the same time allow of a longitudinal or vertical movement, which is effected as follows: A longitudinal groove is formed in the spindle $h$, in which fits a feather or projection on one side of the hole in the worm-wheel through which the spindle passes. The worm-wheel $m$ engages with a worm, $n$, arranged upon a shaft, to which motion is imparted in any suitable manner.

Instead of the worm-gear, as above described, for operating the screw-patterns, pulleys and belts may be used, or gear-wheels having their bores feathered in a manner similar to the worm-wheel above described, and moved by a rack or worms, or by frictional surfaces.

The heads of the screw-molds are formed by the mold-board or heading-plate E, which is securely fastened to the flask by means of hooks or other suitable device. The number shown in the drawings is thirty-two, and the number of pattern-screws is only four. In order to make the four pattern-screws form the thirty-two molds in the molding-board, the latter requires to be shifted eight times. Thus by setting the molding-frame E against the strips $e$ and $e'$, as shown in black lines in Fig. 3, the pattern-screws will form the molds 10 12 14 16, by moving it again against $e$ and $e'''$, as shown in red, the molds 2, 4, 6, and 8 will be formed, and upon setting it against $e'''$ and $e''$, as shown in blue dotted lines, the molds 1, 3, 5, and 7 will be formed, and when against $e''$ and $e'$, as shown in blue lines, the molds 9 11 13 15 will be formed. By changing the position of the molding-board end for end, so as to bring the number 32 in the place of 1, and repeating the above-mentioned manipulations, all the molds can be formed by the use of only a few pattern-screws.

The apertures through the molding-boards and heads may be made larger on the under side of the said molding-board, in order to facilitate the entrance of the pattern-screw.

In molding the heads of the screws the molding-board E is placed upon a platform or table, F, Fig. 4, which is provided with pins $o\,o$, corresponding in number with the heads of the screws, and projecting with their conical and rounded ends a little above the screw-heads, and being of the same diameter as the shank of the screw, fill the aperture through the head-pattern. The molding-board or heading-plate E is then secured to the flask or frame G by means of hooks or other equivalent device, and is filled with the composition of which the mold consists, and the said molding-frame is not removed from the flask until the entire molds are all completed.

Outside and around the edges of each of the head-patterns is a slight depression for the purpose of securing a full circular edge to the heads and preventing the formation of fins on the edge of the same. (See Fig. 7.) The pins $o\,o$ extend above the heads of the screws for the purpose of making a cavity in the sand or mold, and thus facilitate the subsequent operation of the pattern-screws. After being thus prepared the molding-board E, with the frame G, is placed upon the table C of the machine, and, being properly adjusted over the pattern-screws $g$, the cover is securely closed and the screws are put in operation by means of the worm-gears, as before explained, and screwed in and out of the composition. The molding-board and flask are then shifted to the various positions described, and the screw-molds are similarly formed, by which means the molds for the thread and body of the screw are completed.

To facilitate and perfect the casting of the screws each cavity must be connected by runners with a leader and sprues, which are formed in a separate molding-frame, K, as seen in Fig. 6. The molds for the sprues, runners, and leaders are formed, in a similar manner to the molds for the pattern-screws, in a separate molding-frame, H, plate K, and table L.

To the table L are attached pattern-spurs $y\,y$, passing with their cylindrical portions through plate K. On plate K are also the patterns of the runners $x\,x$ and leaders $z\,z$. The spurs $y\,y$ are arranged in such a position and are of the same number as to correspond exactly with the heads on the plate E. The molding-frame H is to be of the same height as the portion of the pattern-spurs above the plate K, so that the top of the sprue-mold may connect with the center of the screw-head, as shown in Fig. 7, so that when the casting is finished and taken from the mold the breakage from the metal will be in the center of the screw-head. The sprue-patterns $y\,y$ may be used as patterns to form rivets, which are cast at the same time with the screws. The breakage of the metal from the screw-head may not be precisely at the center, but at any point between the center and the edge of the screw-head. Any convenient number of flasks may be thus prepared and placed together in a frame or stack, as shown in Fig. 8, where they are properly secured, and are then ready to receive the melted metal. The flask G, being securely attached to the molding-board E, is placed upon the table F, where it is firmly seated. It is then filled with the composition, which is properly rammed and smoothed. The whole is then transferred to the table C, and the screw-patterns are screwed into the composition, forming a series of molds. The patterns are then screwed out of the molds and the molding-board is shifted to the different positions successively, as above described, the patterns being screwed into and out of the composition at each different position of the molding-board. When the molds are all completed the flask is placed in the frame or stack, as shown in Fig. 8.

The part of the mold for forming the top of the screw-head consists of a thin flask, which is secured to the molding-board and then placed on a frame or table fitted with sprue-patterns corresponding in number and position with those of the screw-molds. It is then filled with sand or composition, and, after being properly rammed and struck off, is placed opposite and against the screw-mold. The flasks are secured in the stack by means of a screw and plate arranged at one end, as seen in Fig. 8. The melted metal is then poured into the molds and passing through the leaders fills the entire mold. When cooled the sprues, which may answer for rivets and screws, are separated, and when properly cleaned subjected to an annealing process.

I am aware of the English patent of Jas. Warren, No. 9,042, 1841, for a machine for making screws, and do not claim any of the mechanism therein described; but

I claim—

1. The combination, with the perforated table C, of the screw-patterns $g\ g\ g\ g$ and the mold-board E, provided with the perforations, as described, substantially as and for the purpose set forth.

2. The detachable spindles $h$, provided with the pattern-screws $g$ and corresponding guide-screws, $i$, substantially as and for the purpose specified.

3. The perforated table or plate C, provided with the adjusting strips or gages $e\ e'\ e''\ e'''$, as and for the purpose described.

4. So forming the molds of the runners, leaders, and sprues, and connecting them with the molds for the screws, that the breakage of the metal will be at or near the center of the screw-heads, as set forth.

In testimony whereof I have signed my name to this specification in the presence of two subscribing witnesses.

EDWIN H. KEITH.

Witnesses:
J. H. ADAMS,
M. S. G. WILDE.